United States Patent
Faria (10) Patent No.: US 7,329,342 B2
(45) Date of Patent: *Feb. 12, 2008

(54) METALLIC PARTICLE TRAP BYPASS FILTER

(76) Inventor: Manuel S. Faria, 6080 Leonard Noell Dr., Tulare, CA (US) 93274-1097

( * ) Notice: Subject to any disclaimer, the term of this patent is extended or adjusted under 35 U.S.C. 154(b) by 463 days.

This patent is subject to a terminal disclaimer.

(21) Appl. No.: 10/989,021

(22) Filed: Nov. 15, 2004

(65) Prior Publication Data

US 2006/0102533 A1    May 18, 2006

(51) Int. Cl.
*B01D 35/147* (2006.01)
(52) U.S. Cl. ............... 210/167.03; 210/167.05; 210/130; 210/132; 210/223; 184/6.25
(58) Field of Classification Search ........... 210/167.03, 210/167.05, 167.29, 430, 431, 432, 130, 210/132, 133, 223; 184/6.25
See application file for complete search history.

(56) References Cited

U.S. PATENT DOCUMENTS

| | | | |
|---|---|---|---|
| 3,072,260 A * | 1/1963 | Szwargulski et al. ....... 210/223 |
| 3,165,473 A * | 1/1965 | Pall et al. ................ 210/493.1 |
| 3,701,424 A * | 10/1972 | Brown et al. ................ 210/90 |
| 4,166,792 A | 9/1979 | Offer et al. ................ 210/131 |
| 4,450,075 A | 5/1984 | Krow ........................ 210/223 |
| 4,501,660 A | 2/1985 | Hebert ...................... 210/209 |
| 4,613,435 A | 9/1986 | Shoemaker ................ 210/222 |
| 4,622,136 A | 11/1986 | Karcey ...................... 210/168 |
| 4,689,144 A | 8/1987 | Holmes ..................... 210/130 |
| 4,705,626 A | 11/1987 | Morelli ..................... 210/130 |
| 4,826,592 A | 5/1989 | Taylor ....................... 210/223 |
| 4,839,041 A * | 6/1989 | Kuwayama et al. .... 210/167.03 |
| 4,851,116 A | 7/1989 | Tomita ...................... 210/222 |
| 4,950,400 A * | 8/1990 | Girondi ..................... 210/335 |
| 5,066,391 A | 11/1991 | Faria ......................... 210/85 |
| 5,078,871 A | 1/1992 | McCready ................. 210/222 |
| 5,228,990 A | 7/1993 | Chiang ...................... 210/223 |
| 5,423,983 A | 6/1995 | Chiang ...................... 210/223 |
| 5,441,647 A | 8/1995 | Wascher et al. ........... 210/695 |
| 5,569,373 A | 10/1996 | Smith et al. ................ 210/90 |
| 5,702,598 A | 12/1997 | Lemon et al. ............. 210/223 |
| 5,716,517 A | 2/1998 | Lasky ....................... 210/130 |
| 5,814,211 A | 9/1998 | Leo ............................ 210/90 |
| 5,817,233 A | 10/1998 | Cooper ..................... 210/223 |
| 5,932,108 A | 8/1999 | Brunsting ................. 210/695 |
| 6,007,716 A | 12/1999 | Calvert ..................... 210/223 |

(Continued)

OTHER PUBLICATIONS

Racor Fuel Filtration Products Catalog (May 2001, 28 pages).

(Continued)

*Primary Examiner*—Terry K Cecil
(74) *Attorney, Agent, or Firm*—St. Onge Steward Johnston & Reens LLC (57) ABSTRACT

A metallic particle trap bypass filter is disclosed generally comprising a housing, a filter element disposed therein, an inflow chamber, an outflow chamber, a bypass valve connecting these chambers, and a magnet disposed in the outflow chamber. In some embodiments, the magnet is a magnetic rod. In certain advantageous embodiments, a second filter element, with a different mesh size than the first filter element, is coupled to the first filter element. In some embodiments, the filter element in stainless steel, and in certain embodiments, the filter element is pleated.

22 Claims, 7 Drawing Sheets

U.S. PATENT DOCUMENTS

| | | | |
|---|---|---|---|
| 6,210,572 B1 | 4/2001 | Tulchinskiy | 210/223 |
| 6,267,875 B1 | 7/2001 | Leo | 210/90 |
| 6,349,693 B1 | 2/2002 | Reinosa | 123/196 |
| 6,423,215 B1 | 7/2002 | Stein | 210/131 |
| 2006/0102534 A1* | 5/2006 | Faria | 210/130 |

OTHER PUBLICATIONS

System 1 Filter Systems Catalog (1990, 8 pages).
System 1 Filter Systems Catalog (1993, 8 pages).
System 1 Filtration Commercial & Industrial Filter Catalog (1993, 8 pages).
System 1 Filter Systems Catalog (1996, 8 pages).
System 1 Filter Systems Catalog (1999, 8 pages).
System 1 Filter Systems Catalog (2001, 4 pages).
System 1 Filter Systems Catalog (2003, 8 pages).

* cited by examiner

METALLIC PARTICLE TRAP BYPASS FILTER

FIELD OF THE INVENTION

The present invention relates to an apparatus for trapping metallic particles in a filter assembly. More specifically, the invention relates to a magnetic trap for use in oil filters.

BACKGROUND OF THE INVENTION

Known systems for lubricating an engine circuitously pump oil over and around moving engine parts with friction bearing surfaces such as valves and piston rods. With the passage of time, this oil acquires various contaminants, which are often particulates that have been shaved off of the engine parts themselves. As these abrasive particles circulate through the engine with the oil, they cause additional particulates to be shaved off of the engine parts. Therefore, a filter is typically placed somewhere in the path of the oil flow. This filter typically contains a filter element sleeve made from a porous material through which the oil can flow. After the oil has entered the filter, it must pass through this filter element before exiting the filter again. As the oil flows through the filter element, the particulates that have accumulated in the oil are retained.

One problem with these filters is that the filter element becomes clogged with the particulates that it is designed to retain. When a large amount of particulates are retained, the oil passing through the filter is impeded, thereby decreasing the volume of oil exiting the filter. As the volume of the flow diminishes, parts of the machine or engine that are normally lubricated receive inadequate lubrication. In some cases, the filter element becomes completely blocked, and thus, oil ceases to flow through the filter altogether. This not only can result in serious damage to the engine, but can even cause the engine to seize.

Additionally, when the filter element becomes clogged and the flow of oil is restricted, the differential pressure across the filter element increases. Because the material used to make the filter element is often relatively weak for purposes of permeability or cost, the increased pressure will often cause the filter element to tear. When this occurs, the filter element will sometimes break apart, and pieces will be swept away with the oil, thereby adding to, rather than reducing, the amount of particulates in the oil that cause wear to the engine parts over which the oil flows.

Another problem with these filters is that, when an engine in a cold environment is started, the viscosity of the oil is high, and thus, it resists flowing through the filter element. Just as when the oil is prevented from flowing through the filter element when the element is clogged, when oil flow through the filter element is restricted due to increased viscosity of the oil, inadequate lubrication, no lubrication, or torn filter elements may result.

Therefore, it is advantageous to have a mechanism that permits the oil to bypass the filter element when oil is not able to flow through the element. Accordingly, several bypass valve assemblies for use in filters have been suggested, such as that disclosed in U.S. Pat. No. 4,622,136 to Karcey, which is assigned to the assignee of the present application and which is incorporated herein by reference. Such assemblies, which form a barrier between the space surrounding the outside of the filter element and the space inside the filter element, are typically responsive to an excessive amount of pressure in the space surrounding the outside of the element.

When a filter element through which the oil normally flows becomes clogged, or the oil cannot flow through the element because the oil is too viscous, the pressure in the filter housing in the space surrounding the outside of the filter element increases. The bypass valve responds to a certain predetermined amount of pressure by opening, thereby permitting the oil to bypass the filter element by flowing through this opening, into the space inside the filter element, and ultimately back out of the filter housing.

A very serious problem with these filters, however, is that they are very limited with respect to the amount of filtering that they can achieve. This results from the fact that much of the contamination present in the oil is metallic particulates. These particulates are heavy, and thus, an excessive amount of this particulate matter is likely to cause traditional filter elements, which are typically paper, to tear. When this occurs, the oil will not only return to the engine unfiltered, but may be yet more contaminated, as it will likely include pieces of the filter element itself. Alternatively, in order to prevent such ripping of the filter element, the bypass valve can be set to open in response to a lower amount of pressure, thereby causing a greater volume of oil to return to the engine unfiltered. However, because the step of flowing through the filter element, which would normally retain particulates in the oil, has been skipped, the oil will still contain the particulate matter.

Accordingly, several filter assemblies have been proposed to combat the problems resulting from the presence of excessive metallic particulates in the oil. One type of assembly that has been suggested is the use of a bypass valve in conjunction with a stainless steel filter element, such as that disclosed in U.S. Pat. No. 6,267,875 to Leo. This arrangement can be advantageous because the filter element is stronger than tradition paper filter elements. Therefore, it can withstand a greater amount of pressure, and thus, the bypass valve can be set to open only in response to a greater amount of pressure than would be feasible for a paper element. The extra time and pressure resulting from this greater threshold permits more oil to be forced through the filter element before the bypass valve opens.

Another type of assembly that has been proposed is the use of a bypass valve in conjunction with a magnet or magnets. The value of using magnets in an oil filter in order to attract metallic particulates in the oil is well known. Accordingly, it has been suggested to use a magnet in a bypass filter, such as that disclosed in U.S. Pat. No. 4,689,144 to Holmes. This arrangement can be advantageous because the magnet serves as a sort of fallback filtering mechanism, such that the oil still receives some filtering if the filter element is bypassed.

One disadvantage of these assemblies, however, is that they are complex, include many parts, or have parts that render the assembly difficult to disassemble and reassemble, thereby resulting is assemblies that are costly and/or difficult to clean or replace. Arrangements facilitating disassembly are especially important in bypass filters, as contaminated oil often flows through the bypass assembly, thereby clogging or damaging it.

A further disadvantage of these assemblies is that they do not employ arrangements that are optimal for both increasing the volume of oil that must flow through the filter element and increasing the degree of filtering of that oil, while, at the same time, also provide a backup filtering mechanism for oil that bypasses the filter element. While it is critical that some sort of back-up filtering mechanism is in place in order to remove some of the damaging particulates from the oil when the filter element is bypassed, it is also important to provide both magnetic and non-magnetic filtering to as much of the oil as possible before the bypassing mechanism is employed. This is because many of the particles that contaminate the oil are magnetic in nature, usually falling into one of two categories: ferromagnetic particles, such as Fe, Co, Ni, and other metals and metal alloys, and ferrimagnetic particles, such as magnetic oxides $Fe_3O_4$, $\gamma$-$Fe_2O_3$, various ferrites, $CrO_2$ and the like. Accordingly, such particles can be attracted by magnets, such as are defined by the formulas $SrFe_{12}O_{19}$ or $BaFe_{12}O_{19}$. However, some are non-magnetic, such as metal oxides. In fact, as metallic particles enter the circulating oil, they experience an oxidation process and thereby become less magnetic. Additionally, a non-magnetic filtering device, such as traditional filter element, can only remove particles having at least a certain minimum size, because, in order to retain smaller particles, one must use a filter medium that would also decrease the flow rate of the oil. Accordingly, it is advantageous to have a secondary filtering device to remove the smaller particulates that the filter element could not retain.

What is desired, therefore, is an apparatus that both maximizes the amount of oil that is forced through the filter element before a bypass valve opens and maximizes the amount of filtering experienced by the oil that flows through the filter element, and simultaneously provides a back-up filtering mechanism for filtering the oil that does eventually bypass the filter element. What is further desired is an apparatus that is inexpensive to manufacture and easy to clean.

SUMMARY OF THE INVENTION

Accordingly, it is an object of the present invention to provide a filter that filters oil even when the oil bypasses a filter element.

It is a further object of the present invention to provide a filter that further filters oil after the oil has already been filtered by a filter element.

It is another object of the present invention to provide a filter that maximizes the amount of oil that flows through a filter element before allowing the oil to bypass the element.

It is yet another object of the present invention to provide a filter that is easily disassembled and reassembled.

To overcome the deficiencies in the prior art and to achieve at least some of the objects and advantages listed, the invention comprises a metallic particle trap bypass filter including a housing having at least one inlet port, at least one outlet port, and an interior surface, a filter element disposed in the housing, the filter element having an exterior surface, an inflow chamber comprising the space between the interior surface of the housing and the exterior surface of the filter element, an outflow chamber comprising the space inside the filter element, a bypass valve assembly connecting the inflow chamber to the outflow chamber, and a magnet disposed in the outflow chamber, wherein, the at least one inlet port is in fluid communication with the inflow chamber to introduce oil into the inflow chamber, and wherein the at least one outlet port is in fluid communication with the outflow chamber to expel oil from the outflow chamber.

In another embodiment the invention comprises a metallic particle trap bypass filter including a housing having at least one inlet port, at least one outlet port, and an interior surface, a filter element disposed in the housing, the filter element having an exterior surface, an inflow chamber comprising the space between the interior surface of the housing and the exterior surface of the filter element, an outflow chamber comprising the space inside the filter element, a bypass valve assembly connecting the inflow chamber to the outflow chamber, a magnet disposed in the outflow chamber, a first fluid pathway defined when the bypass valve is closed, in which oil flows through the inlet port, into the inflow chamber, through the filter element, into the outflow chamber, over the magnetic rod, and through the outlet port, and a second fluid pathway defined when the valve is open, in which oil flows through the inlet port, into the inflow chamber, through the valve assembly, into the outflow chamber, over the magnetic rod, and through the housing port.

DETAILED DESCRIPTION OF THE DRAWINGS

Figure 1:
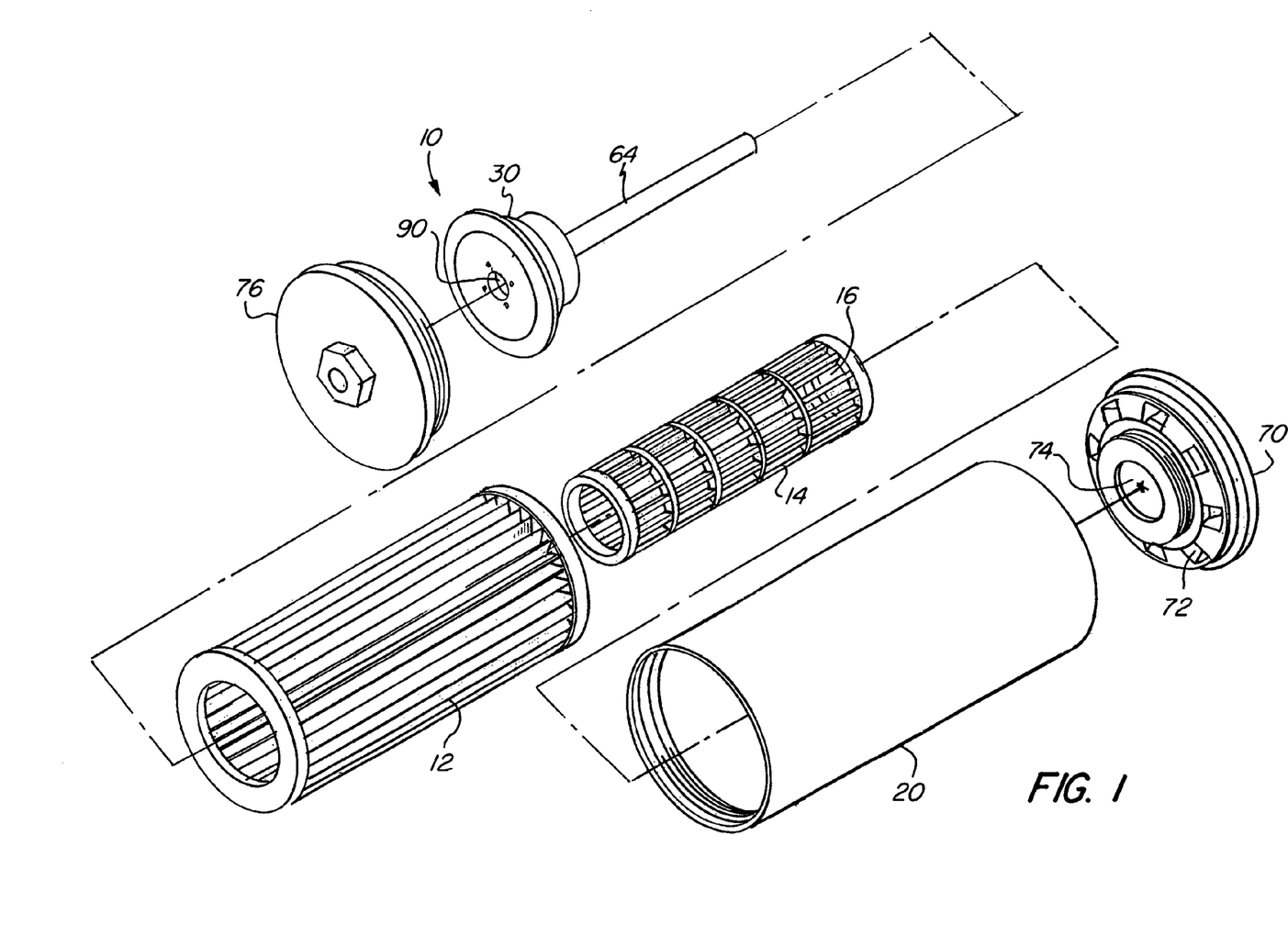
FIG. 1 is an exploded isometric view of metallic particle trap bypass filter in accordance with the invention.

The basic components of one embodiment of a filter 10 in accordance with the invention are illustrated in FIG. 1. As used in the description, the terms "top," "bottom," "above," "below," "over," "under," "above," "beneath," "on top," "underneath," "up," "down," "upper," "lower," "front," "rear," "back," "forward" and "backward" refer to the objects referenced when in the orientation illustrated in the drawings, which orientation is not necessary for achieving the objects of the invention.

Figure 2:
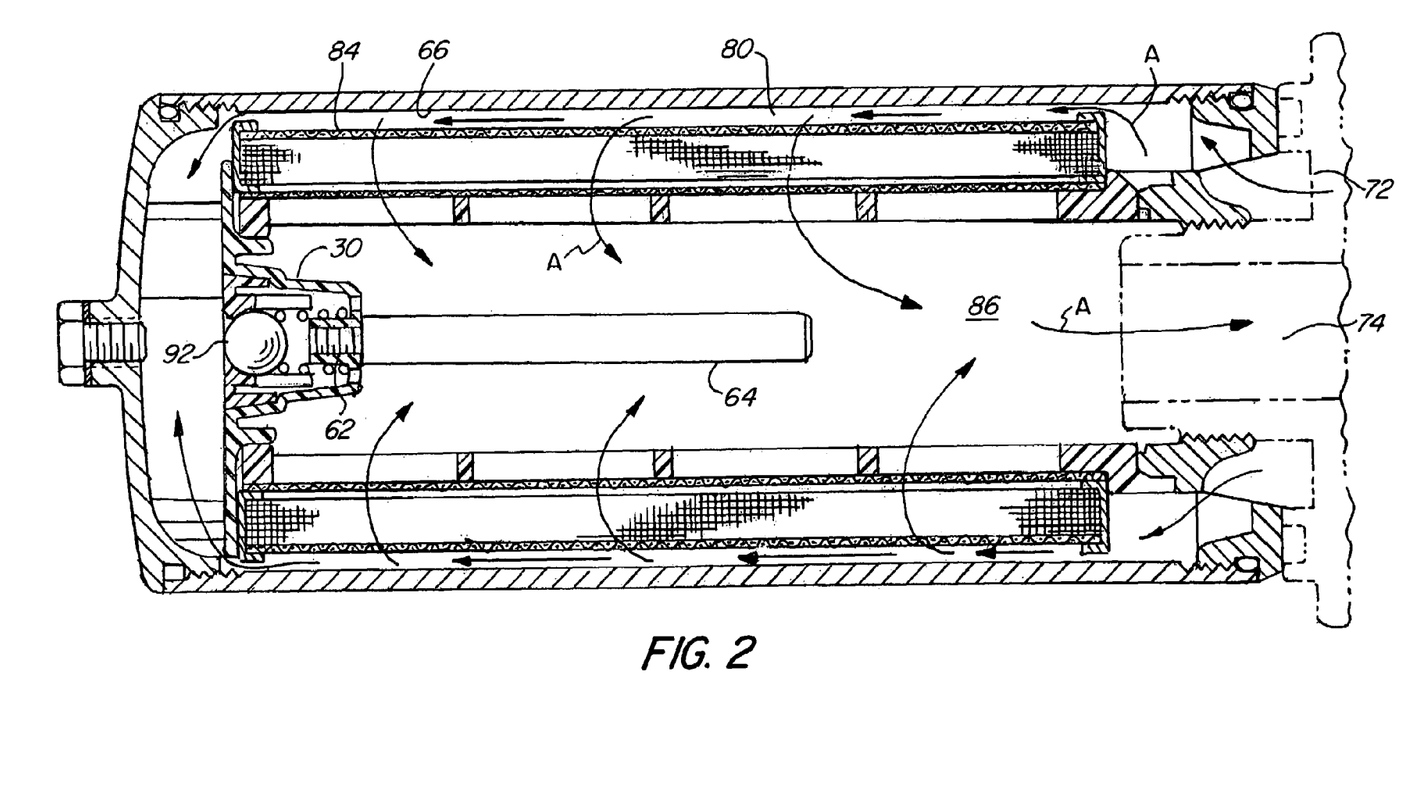
FIG. 2 is an exposed side view in partial cross-section of the bypass filter of FIG. 1 illustrating the flow path of oil flowing through a filter element.
Figure 3:
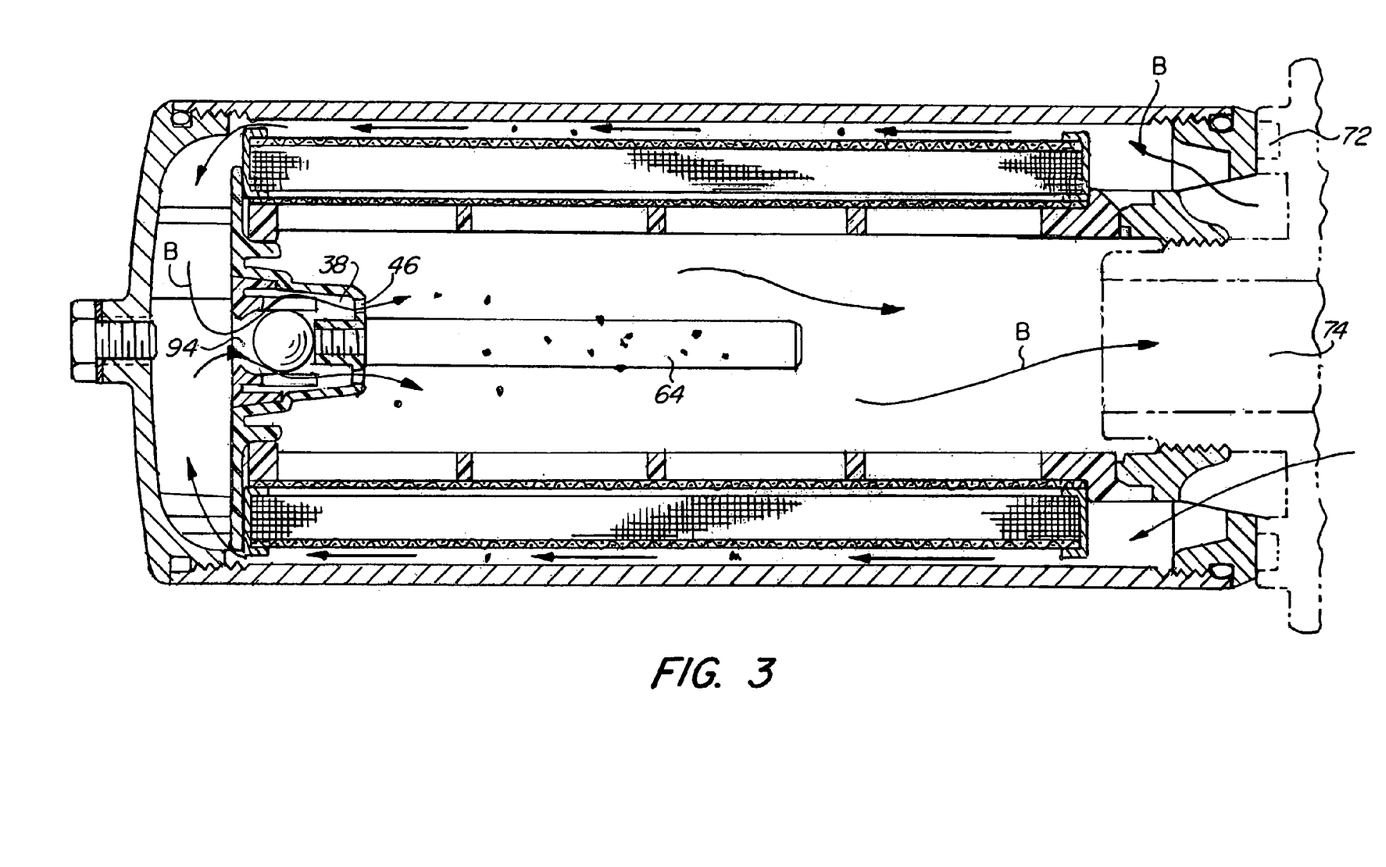
FIG. 3 is an exposed side view in partial cross-section of the bypass filter of FIG. 1 illustrating the flow path of oil bypassing a filter element.

In the embodiment depicted in FIG. 1-3, a filter element 12 is disposed inside a housing 20. In certain embodiments, the filter element 12 is a self-sustaining filter element. In other embodiments, the filter element 12 is a sleeve disposed on a filter element support member 14. In certain embodiments, the support member 14 is merely a frame. In certain other embodiments, the support member 14 is a tube having a plurality of holes 16 therein, such as, for example, longitudinal slots, latitudinal slots, or circular openings.

In certain embodiments, the top of the housing is integrally formed with the side of housing 20. In other embodiments, the top of the housing 20 is a detachable top cap 70, which facilitates easy removal of the sleeve 12 for cleaning or replacement. The top of the housing has at least one housing inlet port 72, which is in fluid communication with an inflow chamber 80, for introducing oil into the housing 20 and at least one housing outlet port 74, which is in fluid communication with an outflow chamber 86, for discharging liquid from the housing 20. Similarly, in some embodiments, the bottom of the housing is integrally formed with the side of the housing 20, while in other embodiments, the bottom of the housing 20 is a bottom cap 76, which facilitates easy removal of the sleeve 12 and bypass assembly 30 for cleaning or replacement.

In certain advantageous embodiments, the sleeve 12 is comprised of a stainless steel mesh. Thus, the sleeve 12 is much stronger than traditional paper filters, and can withstand a great deal of pressure in the inflow chamber 80 without tearing. Accordingly, the bypass assembly 30 can be arranged to only open the bypass valve 90 at very high threshold pressure, thereby maximizing the amount of oil that will be forced through the sleeve 12.

In certain advantageous embodiments, the sleeve 12 is pleated. This provides the sleeve 12 with more rigidity, thereby making it less prone to collapse as a result of pressure in the inflow chamber 80, thereby allowing the bypass assembly 30 to be arranged such that the bypass valve 90 will only open at a higher threshold pressure. Additionally, this provides the filter element with much greater surface area through which the oil can flow, thereby increasing the volume flow rate of the oil in order to compensate for any decrease that may result from using a filter element sleeve 12 designed to trap yet smaller particles, and further, providing more area that must become clogged before a sufficient amount of pressure builds in the inflow chamber 80 to open the bypass valve 90.

A bypass valve assembly 30, which has a bypass valve 90, is disposed in the bottom of the sleeve 12 in order to permit oil in the housing 20 to bypass the sleeve 12, the process of which is further described below.

The basic components of some embodiments of the bypass valve assembly 30 are illustrated in FIGS. 4-8. The assembly has an input end 33, an output end 35, and a bypass chamber 38. The input end has an aperture 40 for introducing oil into the bypass chamber 38, and the output end 35 has at least one bypass outlet port 46 for discharging oil from the bypass chamber 38.

In the particular embodiments shown in these figures, the bypass assembly 30 is a ball and spring check valve. Accordingly, inside the bypass chamber 38, a ball bearing 42 is biased against the aperture 40 by a spring 44 and operates as further described below.

Figures 4A, 4B:
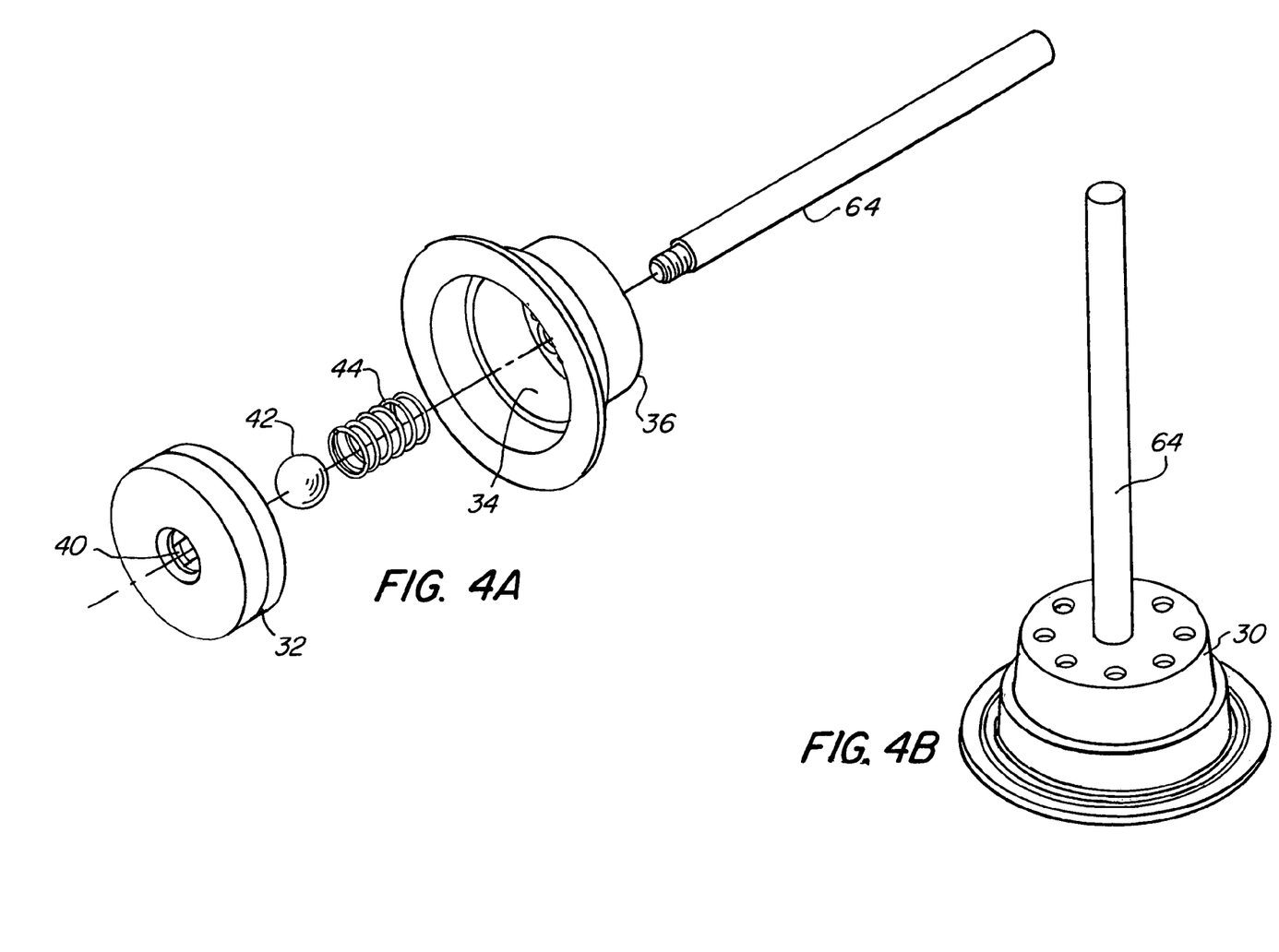
FIG. 4A is an exploded isometric view of one embodiment of the magnetic rod and bypass valve of the filter of FIG. 1.
FIG. 4B is an isometric view of the magnetic rod and bypass valve of FIG. 4A when fully assembled.
Figure 5:
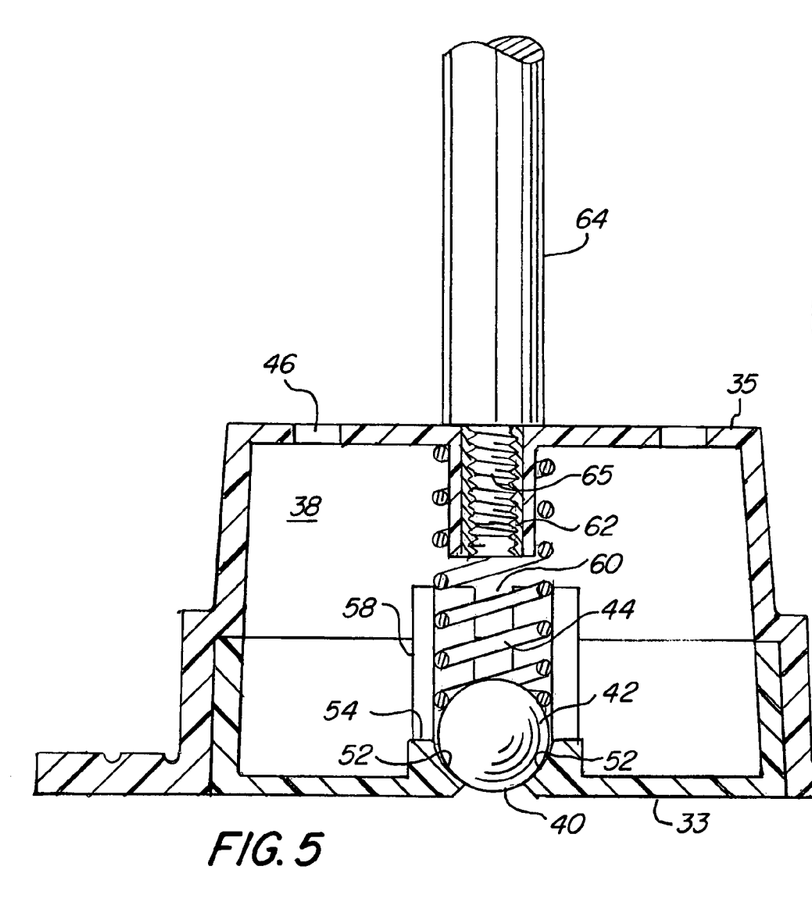
FIG. 5 is an exposed side view in partial cross-section of the bypass assembly of the filter of FIG. 1.

In certain advantageous embodiments, the bypass assembly 30 comprises a base plate 36 with a cavity 34, and the input end 33 of the bypass assembly 30 is a bypass cap 32 that is disposed in the cavity 34, thereby defining the bypass chamber 38. This arrangement permits one to easily open the bypass valve assembly 30, which may be desired for a variety of reasons, such as, for example, to clean the assembly 30 when it becomes clogged with particulate matter over time as a result of serving as a conduit through which unfiltered oil flows, or to replace the spring with another spring having a different tension in order to change the pressure at which the ball bearing 42 will move away from the aperture 40.

In certain advantageous embodiments, a ball bearing seat is formed from a beveled area 52 of the inner face 54 around the aperture 40. This beveled area 52 of the inner face 54 provides a greater area through which the oil may flow around the outside of the ball bearing 42 when the ball bearing 42 is forced away from the aperture 40. Additionally, this beveled area 52 helps guide the ball bearing 42 back over the aperture when spring 44 decompresses and biases the ball bearing 42 against the inner face 54.

Figure 6:
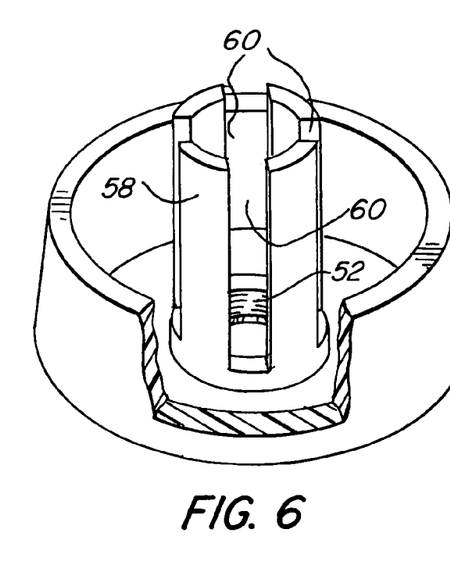
FIG. 6 is an isometric view of the tube of the bypass assembly of FIG. 5.

In certain advantageous embodiments, a ball bearing seat is formed from a tube 58 extending from the inner face 54 up into the bypass chamber 38. The tube 58 ensures that the ball bearing 42 moves only longitudinally in the direction of compression/decompression of the spring 44 when the ball bearing 42 experiences increased pressure or movement. In certain embodiments, the wall of the tube 58 has at least one slot 60 to allow the oil to flow out of the tube 58 and into the bypass chamber 38.

In certain embodiments, a ball bearing seat is formed from both the beveled area 52 and the tube 58.

Figure 7:
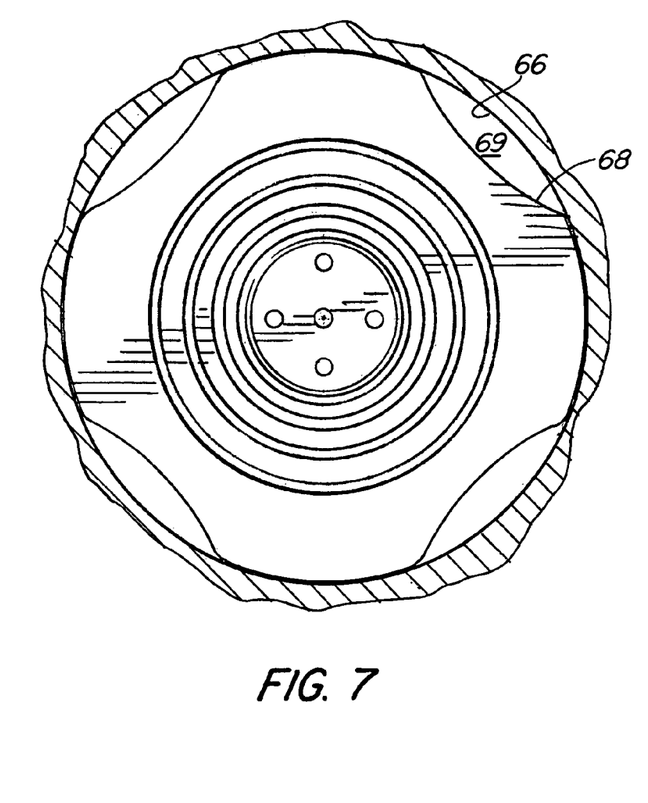
FIG. 7 is an end elevational view of one embodiment of the bypass assembly of FIG. 5.
Figure 8:
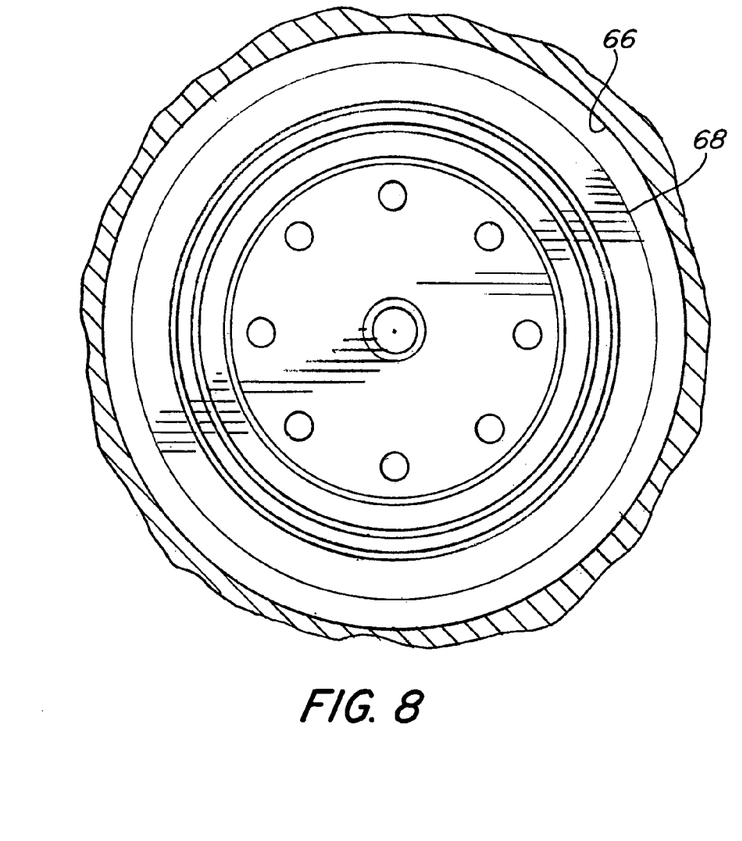
FIG. 8 is an end elevational view of another embodiment of the bypass assembly of FIG. 5.

As shown in FIG. 7, in certain embodiments, the outer rim 68 of the bottom of the base plate 36 is smaller than the interior surface 66 of the housing 20, such that the oil can flow freely through the space between the base plate 36 and the interior surface 66 to the bottom of the bypass valve assembly 30. As shown in FIG. 8, in certain other embodiments, the outer rim 68 of the bottom of the base plate 36 abuts the interior surface 66 of the housing 20, and at least one segment of the outer rim 68 has been shaped such that at least one gap 69 exists between the outer rim 68 and the interior surface 66.

A magnet 64 for attracting metallic particles is disposed inside the sleeve 12. In certain advantageous embodiments, the magnet 64 is a magnetic rod. Due to the elongated shape of the rod, over which the oil flows as it passes through the outflow chamber 86, the oil comes in direct contact with a large surface area of magnetic material. Accordingly, there is a greater likelihood that more metallic particles will be retained. Additionally, because its position in the flow path of the oil is located after both the sleeve 12 and the bypass valve 90, the magnet 64 serves as both a secondary filter for attracting very small particles after the oil has passed through the filter element sleeve 12, and as a back-up filter to provide at least some filtering of the oil when the sleeve 12 is bypassed.

In certain advantageous embodiments, the bypass assembly 30 has an internally threaded cavity 62, and the magnetic rod 64 has a threaded end 65 that is screwed into the cavity 62. In other embodiments, the magnetic rod 64 is integrally formed with the bypass assembly 30.

Figures 9, 10A, 10B:
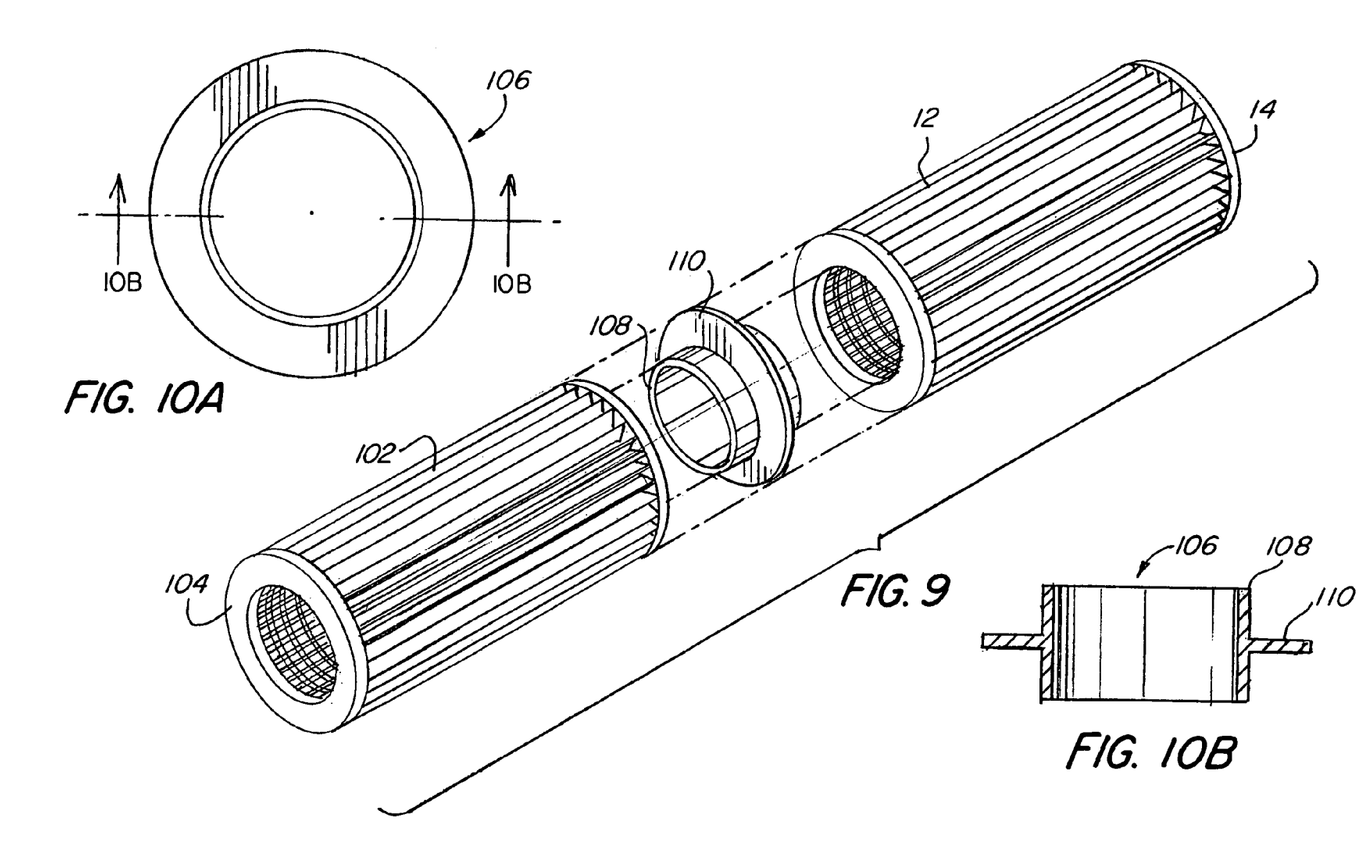
FIG. 9 is an exploded isometric view of the filter element of claim 1 in conjunction with a second filter element and a coupling therefor.
FIG. 10A is an end elevational view of the coupling of FIG. 9.
FIG. 10B is cross-sectional side view of the coupling of FIG. 9.

As illustrated in FIG. 9, in certain advantageous embodiments, a second filter element 102, disposed on a second support member 104, is coupled to the first filter element 12. In some of these embodiments, the first filter element 12 has a different mesh size than the second filter element 102. Accordingly, one filter element with a mesh size for trapping very small particulates can be used without getting clogged as quickly as it normally would, as the other filter element will trap some of the larger particulates, leaving the first filter element free to collect smaller particulates. The second filter element will decrease the likelihood that really large particulates will bypass the filter elements because, even when the smaller-particulate screen gets clogged, the bypass valve 30 will not be immediately activated, as the other filter element will continue to allow oil to pass through it as it traps only larger particulates.

In some of these embodiments, a coupling 106 is provided for coupling the filter elements 12, 102. In the embodiment depicted in FIGS. 9-10, the coupling 106 has a tubular portion 108 and a flange 110. The tubular portion 108 is partially disposed in the first filter element 12 and partially disposed in the second filter element 102, while the flange 110 is disposed between the support members 14, 104.

Operation of the above described bypass filter is illustrated stepwise in FIGS. 2-3. As shown in FIG. 2, oil originally flows through the filter 10 along a first fluid pathway, indicated by arrows A. Oil enters the filter 10 via a plurality of housing inlet ports 72 and into the inflow chamber 80 defined as the space between the interior surface 66 of the housing 20 and the exterior surface 84 of the sleeve 12. Because it is closed, the bypass valve 90 serves as a seal 92 between the inflow chamber 80 and the outflow chamber 86. Thus, from the inflow chamber 80, the oil flows through the stainless steel sleeve 12, which removes particulate matter from the oil, into the outflow chamber 86, defined as the space inside the sleeve 12, and over the magnetic rod 64. From the outflow chamber 86, the oil exits the filter 10 via the housing outlet port 74.

As shown in FIG. 3, when the sleeve 12 is sufficiently clogged, or when the oil is sufficiently viscous, the oil flows through the filter 10 along a second fluid pathway, indicated by arrows B. Oil enters the filter 10 via the housing inlet ports 72 and into the inflow chamber 80. Because the oil is unable to flow through the sleeve 12, pressure begins to build in the inflow chamber 80. When a predetermined threshold pressure is met, the bypass valve 90 in the bypass assembly 30 opens, thereby becoming a conduit 94 through which oil can flow.

In the particular embodiments described herein, when the predetermined threshold pressure is met, the oil forces the ball bearing 42 against the spring 44, thereby compressing the spring 44. As the ball bearing 42 moves longitudinally along the tube 58, an aperture 40 becomes unblocked, and the oil flows through the aperture 40. The oil flows through the beveled area 52 of the inner face 54 of the bypass assembly 30, into the tube 58, through slots 60 and into the bypass chamber 38. From the bypass chamber 38, the oil flows through at least one bypass outlet port 46, into the outflow chamber 86. In this way, oil is able to flow through the bypass assembly 30, into the outflow chamber 86, over the magnetic rod 64, and out of the filter 10 via the housing outlet port 74.

It should be understood that the foregoing is illustrative and not limiting, and that obvious modifications may be made by those skilled in the art without departing from the spirit of the invention. Accordingly, reference should be made primarily to the accompanying claims, rather than the foregoing specification, to determine the scope of the invention.

What is claimed is:

1. A metallic particle trap bypass filter, comprising:
   a housing having at least one inlet port, at least one outlet port, and an interior surface;
   a filter element disposed in said housing, said filter element having an exterior surface and defining a central axis;
   an inflow chamber comprising the space between the interior surface of said housing and the exterior surface of said filter element;
   an outflow chamber comprising the space inside said filter element; and
   a bypass valve assembly enclosed within said housing to be positioned against an end of said filter element and connecting said inflow chamber to said outflow chamber; said bypass valve assembly comprising
   a cap;
   a baseplate removably coupled to said cap, said baseplate having an outer wall with a cavity therein, said baseplate and said cap defining a bypass chamber therebetween; and
   a magnetic rod having a first end removably disposed in the cavity of the outer wall of said baseplate and a second end extending into said outflow chamber;
   wherein said cap has at least one aperture through which oil enters said bypass chamber;
   a pressure responsive valve residing within said bypass chamber and biased to close said at least one aperture;
   wherein said baseplate has a plurality of apertures surrounding the first end of said magnetic rod through which oil exits the bypass chamber and flows over said magnetic rod;
   wherein oil flows through said at least one aperture and said plurality apertures in an axial direction;
   wherein, the at least one inlet port is in fluid communication with said inflow chamber to introduce oil into said inflow chamber; and
   wherein the at least one outlet port is in fluid communication with said outflow chamber to expel oil from said outflow chamber.

2. The filter of claim 1, wherein said filter element is a first filter element, further comprising a second filter element disposed in said housing and coupled to said first filter element.

3. The filter of claim 2, wherein said first filter element has a different mesh size than said second filter element.

4. The filter of claim 3, further comprising:
   a first support member on which said first filter element is disposed;
   a second support member on which said second filter element is disposed; and
   a coupling for connecting said first support member to said second support member, said coupling having a flange;
   wherein said coupling is partially disposed in said first support member and partially disposed in said second support member; and
   wherein said flange is disposed between said first and second support members.

5. The filter of claim 1, wherein said bypass valve assembly includes a valve that is responsive to pressure in said inflow chamber, which valve is a seal between said inflow and outflow chambers when the pressure in said inflow chamber is below a predetermined value, and which valve is a conduit by which said inflow chamber is in fluid communication with said outflow chamber when the pressure in said inflow chamber equals or exceeds the predetermined value.

6. The filter of claim 5, wherein said valve is a ball and spring check valve.

7. The filter of claim 1, further comprising a filter element support member on which said filter element is disposed.

8. The filter of claim 7, wherein said filter element support member is a tube having a plurality of holes therein.

9. The filter of claim 1, wherein said filter element is stainless steel.

10. The filter of claim 9, wherein said filter element is pleated.

11. The filter of claim 1, wherein:
    the first end of said magnetic rod is threaded; and
    the cavity in the outer wall of said baseplate comprises a threaded cavity into which the threaded end of said magnetic rod is screwed.

12. A metallic particle trap bypass filter, comprising:
a housing having at least one inlet port, at least one outlet port, and an interior surface;
a filter element disposed in said housing, said filter element having an exterior surface and defining a central axis;
an inflow chamber comprising the space between the interior surface of said housing and the exterior surface of said filter element;
an outflow chamber comprising the space inside said filter element;
a bypass valve assembly enclosed within said housing to be positioned against an end of said filter element and connecting said inflow chamber to said outflow chamber, said bypass valve assembly comprising
a cap;
a baseplate removably coupled to said cap, said baseplate having an outer wall with a cavity therein, said baseplate and said cap defining a bypass chamber therebetween; and
a magnetic rod having a first end removably disposed in the cavity of the outer wall of said baseplate and a second end extending into said outflow chamber;
wherein said cap has at least one aperture through which oil enters said bypass chamber;
a pressure responsive valve residing within said bypass chamber and biased to close said at least one aperture;
wherein said baseplate has a plurality of apertures surrounding the first end of said magnetic rod through which oil exits the bypass chamber and flows over said magnetic rod;
wherein oil flows through said at least one aperture and said plurality apertures in an axial direction;
a first fluid pathway defined when the bypass valve is closed, in which oil flows through said inlet port, into said inflow chamber, through said filter element, into said outflow chamber, over said magnetic rod, and through said outlet port; and
a second fluid pathway defined when said valve is open, in which oil flows through said inlet port, into said inflow chamber, through said valve assembly, into said outflow chamber, over said magnetic rod, and through said housing port.

13. The filter of claim 12, wherein said filter element is a first filter element, further comprising a second filter element disposed in said housing and coupled to said first filter element.

14. The filter of claim 13, wherein said first filter element has a different mesh size than said second filter element.

15. The filter of claim 14, further comprising:
a first support member on which said first filter element is disposed;
a second support member on which said second filter element is disposed; and
a coupling for connecting said first support member to said second support member, said coupling having a flange;
wherein said coupling is partially disposed in said first support member and partially disposed in said second support member; and
wherein said flange is disposed between said first and second support members.

16. The filter of claim 12, wherein said bypass valve assembly includes a valve that is responsive to pressure in said inflow chamber, which valve is a seal between said inflow and outflow chambers when the pressure in said inflow chamber is below a predetermined value, and which valve is a conduit by which said inflow chamber is in fluid communication with said outflow chamber when the pressure in said inflow chamber equals or exceeds the predetermined value.

17. The filter of claim 16, wherein said valve is a ball and spring check valve.

18. The filter of claim 12, further comprising a filter element support member on which said filter element is disposed.

19. The filter of claim 18, wherein said filter element support member is a tube having a plurality of holes therein.

20. The filter of claim 12, wherein said filter element is stainless steel.

21. The filter of claim 20, wherein said filter element sleeve is pleated.

22. The filter of claim 12, wherein:
the first end of said magnetic rod is threaded;
the cavity in the outer wall of said baseplate comprises a threaded cavity into which the threaded end of said magnetic rod is screwed.

* * * * *